(12) United States Patent
Li

(10) Patent No.: US 11,550,718 B2
(45) Date of Patent: Jan. 10, 2023

(54) METHOD AND SYSTEM FOR CONDENSED CACHE AND ACCELERATION LAYER INTEGRATED IN SERVERS

(71) Applicant: ALIBABA GROUP HOLDING LIMITED, Grand Cayman (KY)

(72) Inventor: Shu Li, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 112 days.

(21) Appl. No.: 17/094,539

(22) Filed: Nov. 10, 2020

(65) Prior Publication Data

US 2022/0147452 A1 May 12, 2022

(51) Int. Cl.
*G06F 12/08* (2016.01)
*G06F 12/0802* (2016.01)
*G06F 3/06* (2006.01)

(52) U.S. Cl.
CPC ........ *G06F 12/0802* (2013.01); *G06F 3/0619* (2013.01); *G06F 3/0655* (2013.01); *G06F 3/0679* (2013.01); *G06F 2212/60* (2013.01)

(58) Field of Classification Search
CPC .. G06F 12/0802; G06F 3/0619; G06F 3/0655; G06F 3/0679; G06F 2212/60
See application file for complete search history.

(56) References Cited

U.S. PATENT DOCUMENTS

| | | | | |
|---|---|---|---|---|
| 5,778,426 A | * | 7/1998 | DeKoning | G06F 12/0866 711/E12.019 |
| 9,042,263 B1 | * | 5/2015 | Yahalom | H04L 41/142 370/253 |
| 10,761,861 B1 | * | 9/2020 | Majerowicz | G06F 8/34 |
| 2008/0001562 A1 | * | 1/2008 | Hobbet | G11B 19/2063 318/270 |
| 2012/0215970 A1 | * | 8/2012 | Shats | G06F 11/1446 711/E12.008 |
| 2015/0213049 A1 | * | 7/2015 | Kleiman | G06F 16/1752 707/692 |
| 2018/0300268 A1 | * | 10/2018 | Yang | G06F 12/0862 |
| 2019/0370168 A1 | * | 12/2019 | Muthiah | G06F 12/0292 |
| 2020/0225868 A1 | * | 7/2020 | Dalmatov | G06F 3/061 |
| 2021/0157514 A1 | * | 5/2021 | Koo | G06F 12/128 |

* cited by examiner

*Primary Examiner* — Hiep T Nguyen
(74) *Attorney, Agent, or Firm* — Finnegan, Henderson, Farabow, Garrett & Dunner, LLP

(57) ABSTRACT

The present disclosure provides methods, systems, and non-transitory computer readable media for operating a cache drive in a data storage system. The methods include receiving, from an IO interface in the cache drive of the compute server, a write request to write data; caching the data corresponding to the write request in a cache storage of the cache drive of the compute server; performing one or more compute processes on the data; and in response to performing the one or more compute processes on the data, providing the processed data to a storage cluster for storing via the IO interface that is communicatively coupled to the storage cluster.

18 Claims, 10 Drawing Sheets

METHOD AND SYSTEM FOR CONDENSED CACHE AND ACCELERATION LAYER INTEGRATED IN SERVERS

TECHNICAL FIELD

The present disclosure generally relates to data storage, and more particularly, to methods, systems, and non-transitory computer readable media operating a data storage system.

BACKGROUND

Datacenters are an increasingly vital component of modern-day computer systems of all form factors as more and more applications and resources become cloud based. Datacenters provide numerous benefits by collocating large amounts of processing power and storage. Datacenters can include compute clusters providing computing powers, and storage clusters providing storage capacity. As the amount of data stored in storage clusters increases, it becomes expensive to maintain both storage capacity and storage performance. Moreover, the compute storage disaggregation moves the data away from the processor and increases the cost of moving the tremendous amount of data. To enhance the overall distributed system performance for accomplishing more tasks in a unit time becomes more and more crucial.

SUMMARY OF THE DISCLOSURE

The present disclosure provides methods, systems, and non-transitory computer readable media for operating a data storage system. An exemplary method includes receiving, from an IO interface in the cache drive of the compute server, a write request to write data; caching the data corresponding to the write request in a cache storage of the cache drive of the compute server; performing one or more compute processes on the data; and in response to performing the one or more compute processes on the data, providing the processed data to a storage cluster for storing via the IO interface that is communicatively coupled to the storage cluster.

Embodiments of the present disclosure further provide a non-transitory computer readable medium that stores a set of instructions that is executable by at least one processor of a data storage system to cause the data storage system to perform a method of operating, the method comprising: receiving, from an IO interface in the cache drive of the compute server, a write request to write data; caching the data corresponding to the write request in a cache storage of the cache drive of the compute server; performing one or more compute processes on the data; and in response to performing the one or more compute processes on the data, providing the processed data to a storage cluster for storing via the IO interface that is communicatively coupled to the storage cluster.

Embodiments of the present disclosure further provide a compute server in a compute cluster, the compute server comprising: a cache drive, comprising: a cache storage configured to store data; an IO interface communicatively coupled to the computer cluster and a storage cluster; and one or more processing units communicatively coupled to the cache storage and the IO interface, wherein the one or more processors are configured to: receive, from the IO interface, a write request to write data; cache the data corresponding to the write request in the cache storage; perform one or more compute processes on the data; and in response to performing the one or more compute processes on the data, provide the processed data to the storage cluster for storing via the IO interface.

Embodiments of the present disclosure further provide a cache drive in a compute server of a computer cluster, the cache drive comprising: a cache storage configured to store data; an IO interface communicatively coupled to the computer cluster and a storage cluster; and one or more processing units communicatively coupled to the cache storage and the IO interface, wherein the one or more processors are configured to: receive, from the IO interface, a write request to write data; cache the data corresponding to the write request in the cache storage; perform one or more compute processes on the data; and in response to performing the one or more compute processes on the data, provide the processed data to the storage cluster for storing via the IO interface.

DETAILED DESCRIPTION

Figure 1:
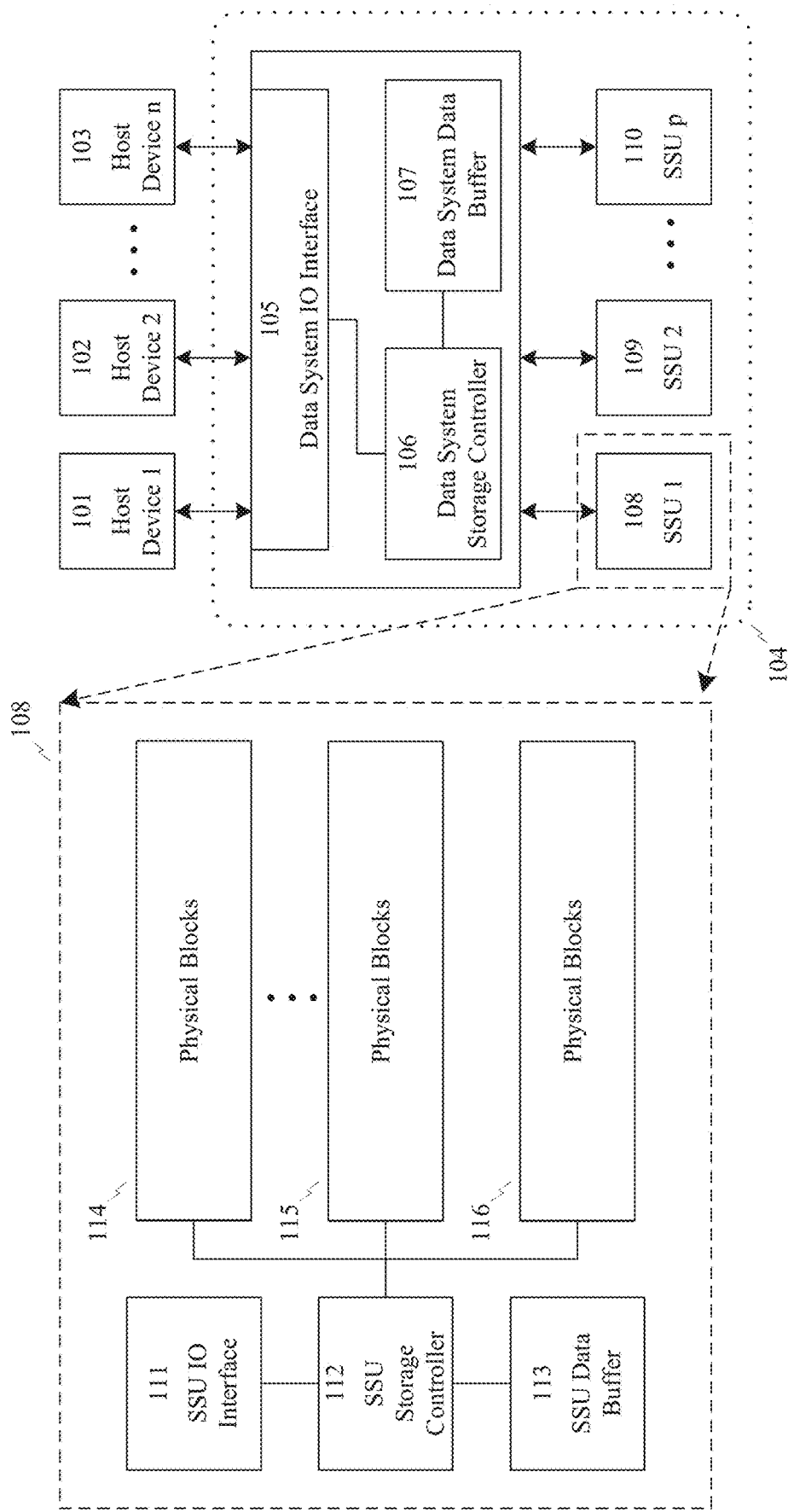
FIG. 1 is a schematic illustrating an example data storage system.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

Modern day computers are based on the Von Neuman architecture. As such, broadly speaking, the main components of a modern-day computer can be conceptualized as two components: something to process data, called a processing unit, and something to store data, called a primary storage unit. The processing unit (e.g., CPU) fetches instructions to be executed and data to be used from the primary storage unit (e.g., RAM), performs the requested calculations, and writes the data back to the primary storage unit. Thus, data is both fetched from and written to the primary storage unit, in some cases after every instruction cycle. This means that the speed at which the processing unit can read from and write to the primary storage unit can be important to system performance. Should the speed be insufficient, moving data back and form becomes a bottleneck on system performance. This bottleneck is called the Von Neumann bottleneck. Thus, high speed and low latency are factors in choosing an appropriate technology to use in the primary storage unit.

Because of their importance, the technology used for a primary storage unit typically prioritizes high speed and low latency, such as the DRAM typically used in modern day systems that can transfer data at dozens of GB/s with latency of only a few nanoseconds. However, because primary storage prioritizes speed and latency, a tradeoff is that primary storage is usually volatile, meaning it does not store data permanently (e.g., primary storage loses data when the power is lost). Primary storage also usually has two other principle drawbacks: it usually has a low ratio of data per unit size and a high ratio price per unit of data.

Thus, in addition to having a processing unit and a primary storage unit, modern-day computers also have a secondary storage unit. The purpose of a secondary storage unit is to store a significant amount of data permanently. As such, secondary storage units prioritize high capacity—being able to store significant amounts of data—and non-volatility—able to retain data long-term. As a tradeoff, however, secondary storage units tend to be slower than primary storage units. Additionally, the storage capacity of secondary storage unit, like the metrics of many other electronic components, tends to double every two years, following a pattern of exponential growth.

However, even though secondary storage units prioritize storage capacity and even though the storage capacity of secondary storage units tends to double every two years, the amount of data needing storage has begun to outstrip the ability of individual secondary storage units to handle. In other words, the amount of data being produced (and needing to be stored) has increased faster than the storage capacity of secondary storage units. The phenomenon of the quickly increasing amount of data being produced is frequently referred to as "big data," which has been referred to as a "data explosion." The cause of this large increase in the amount of data being produced is largely from large increases in the number of electronic devices collecting and creating data. In particular, a large amount of small electronic devices—such as embedded sensors and wearables—and a large number of electronic devices embedded in previously "dumb" objects—such as Internet of Things (IoT) devices—now collect a vast amount of data. The large amount of data collected by these small electronic devices can be useful for a variety of applications, such as machine learning, and such datasets tend to be more beneficial as the amount of data the datasets contain increases. The usefulness of large datasets, and the increase in usefulness as the datasets grow larger, has led to a drive to create and collect increasingly large datasets. This, in turn, has led to a need for using numerous secondary storage units in concert to store, access, and manipulate the huge amount of data being created, since individual secondary storage units do not have the requisite storage capacity.

In general, there are two ways secondary storage units can be used in parallel to store a collection of data. The first and simplest method is to connect multiple secondary storage units to host device. In this first method, the host device manages the task of coordinating and distributing data across the multiple secondary storage units. In other words, the host device handles any additional complications necessary to coordinate data stored across several secondary storage units. Typically, the amount of computation or resources needed to be expended to coordinate among multiple secondary storage units increases as the number of secondary storage units being used increases. Consequently, as the number of attached secondary storage units increases, a system devotes an increasing amount of its resources to manage the attached secondary storage units. Thus, while having the host device manage coordination among the secondary storage units is usually adequate when the number of secondary storage units is few, greater amounts of secondary storage units cause a system's performance to substantially degrade.

Thus, large-scale computer systems that need to store larger amounts of data typically use the second method of using multiple secondary storage units in parallel. The second method uses dedicated, standalone electronic systems, known as data storage systems, to coordinate and distribute data across multiple secondary storage units. Typically, a data storage system possesses an embedded system, known as the data storage controller (e.g., one or more processor, one or more microprocessors, or even a full-fledged server), that handles the various tasks necessary to manage and utilize numerous attached secondary storage units in concert. Also comprising the data storage system is usually some form of primary memory (e.g., RAM) connected to the data storage controller which, among others uses, is usually used as one or more buffers. The data storage system also comprises one or more attached secondary storage units. The attached secondary storage units are what physically store the data for the data storage system. The data storage controller and secondary storage unit are usually connected to one another via one or more internal buses. The data storage controller is also usually connected to one or more external host devices in some manner, usually through some type of IO interface (e.g., USB, Thunderbolt, InfiniB and, Fibre Channel, SAS, SATA, or PCIe connections), through which the data storage controller receives incoming IO request and sends outgoing IO responses.

In operation, the data storage controller acts as the interface between incoming IO requests and the secondary storage units. The data storage controller acts as an abstraction layer, usually presenting only a single unified drive to attached host devices, abstracting away the need to handle multiple secondary storage units. The data storage controller then transforms the incoming IO requests as necessary to perform any IO operations on the relevant secondary storage units. The data storage controller also performs the reverse operation, transforming any responses from the relevant secondary storage units (such as data retrieved in response to an IO READ request) into an appropriate outgoing IO response from the data storage system. Some of the transformation operations performed by the data storage controller include distributing data to maximize the performance and efficiency of the data storage system, load balancing, encoding and decoding the data, and segmenting and storing the data across the secondary storage units. Data storage systems—through the data storage controller—also are typically used to perform more complex operations across multiple secondary storage units, such as implementing RAID (Redundant Array of Independent Disks) arrays.

FIG. 1 is a schematic illustrating an example data storage system. As shown in FIG. 1, data storage system 104 comprises data system storage controller 106, data system IO interface 105, data system data buffer 107, and several secondary storage units ("SSUs"), shown here as secondary storage units 108, 109, and 110. Data system storage controller 106 receives incoming IO requests from data system IO interface 105, which data system storage controller 106 processes and, in conjunction with data system data buffer 107, writes data to or reads data from secondary storage units 108, 109, and 110 as necessary. The incoming IO requests that data system storage controller 106 receives from data system IO interface 105 come from the host devices connected to data storage system 104 (and which are thus using data storage system 104 to store data). As shown in FIG. 1, in general a data storage system may be connected to multiple host devices, shown here as host devices 101, 102, and 103.

FIG. 1 is a basic schematic illustrating a generalized layout of a secondary storage unit. Using secondary storage unit 108 as an example, FIG. 1 shows how a secondary storage unit comprises an SSU IO interface 111 that receives incoming IO requests and sends outgoing responses. SSU IO interface 111 is connected to SSU storage controller 112, which receives IO request from SSU IO interface 111. In conjunction with SSU data buffer 113, SSU storage controller 112 processes IO requests by reading or writing data from physical blocks, shown here as physical blocks 114, 115, and 116. SSU storage controller 112 may also use SSU IO interface 111 to send responses to IO requests.

While data storage systems can appear even with traditional standalone PCs—such as in the form of external multi-bay enclosures or RAID arrays—by far their most prevalent usage is in large, complex computer systems. Specifically, data storage systems most often appear in datacenters, especially datacenters of cloud service providers (as opposed to datacenters of individual entities, which tend to be smaller). Datacenters typically require massive storage systems, necessitating usage of data storage systems. Typically, a data storage system used by a datacenter is a type of specialized server, known as storage servers or data storage servers. However, typically datacenters, especially the larger ones, have such massive storage requirements that they utilize specialized architecture, in addition to data storage systems, to handle the large volume of data.

Like most computer systems, datacenters utilize computers that are broadly based on the Von Neuman architecture, meaning they have a processing unit, primary storage unit, and secondary storage unit. However, in datacenters, the link between processing unit, primary storage unit, and secondary storage unit is unlike most typical machines. Rather than all three being tightly integrated, datacenters typically organize their servers into specialized groups called computer clusters and storage clusters. Computer clusters comprises nodes called compute nodes, where each compute node can be a server with (typically several) processing units (e.g., CPUs) and (typically large amounts of) primary storage units (e.g., RAM). The processing units and primary storage units of each compute node can be tightly connected with a backplane, and the compute nodes of a computer cluster are also closely coupled with high-bandwidth interconnects, e.g., InfiniBand. However, unlike more typical computer systems, the compute nodes do not usually include much, if any, secondary storage units. Rather, all secondary storage units are held by storage clusters.

Like computer clusters, storage clusters include nodes called storage nodes, where each storage node can be a server with several secondary storage units and a small number of processing units necessary to manage the secondary storage units. Essentially, each storage node is a data storage system. Thus, the secondary storage units and the data storage controller (e.g., the data storage controller's processing units) are tightly connected with a backplane, with storage nodes inside a storage cluster similarly closely connected with high-bandwidth interconnects.

The connection between computer clusters and storage clusters, however, is only loosely coupled. In this context, being loosely coupled means that the computer clusters and storage clusters are coupled to one another with (relatively) slower connections. While being loosely coupled may raise latency, the loose coupling enables a much more flexible and dynamic allocation of secondary storage units to processing units. This is beneficial for a variety of reasons, with one reason being that it allows dynamic load balancing of the storage utilization and bandwidth utilization of the various storage nodes. Being loosely coupled can also allow data to be split among multiple storage nodes (like how data within a storage node can be split among multiple secondary storage units), which can also serve to load-balance IO requests and data storage.

Typically, the connection between secondary storage units and processing units can be implemented on the basis of whole storage clusters communicating with whole computer clusters, rather than compute nodes communicating with storage nodes. The connection between storage clusters and computer clusters is accomplished by running all requests of a given cluster (computer or storage) through a load-balancer for the cluster. While routing requests through a load balancer on the basis of clusters raises latency, this arrangement enables large gains in efficiency since each system can better dynamically manage its traffic. In practice, compute time is typically the dominating factor, making memory latency relatively less of an issue. The large amount of RAM available also typically allows preloading needed data, helping to avoid needing to idle a compute node while waiting on data from a storage cluster.

Figure 2:
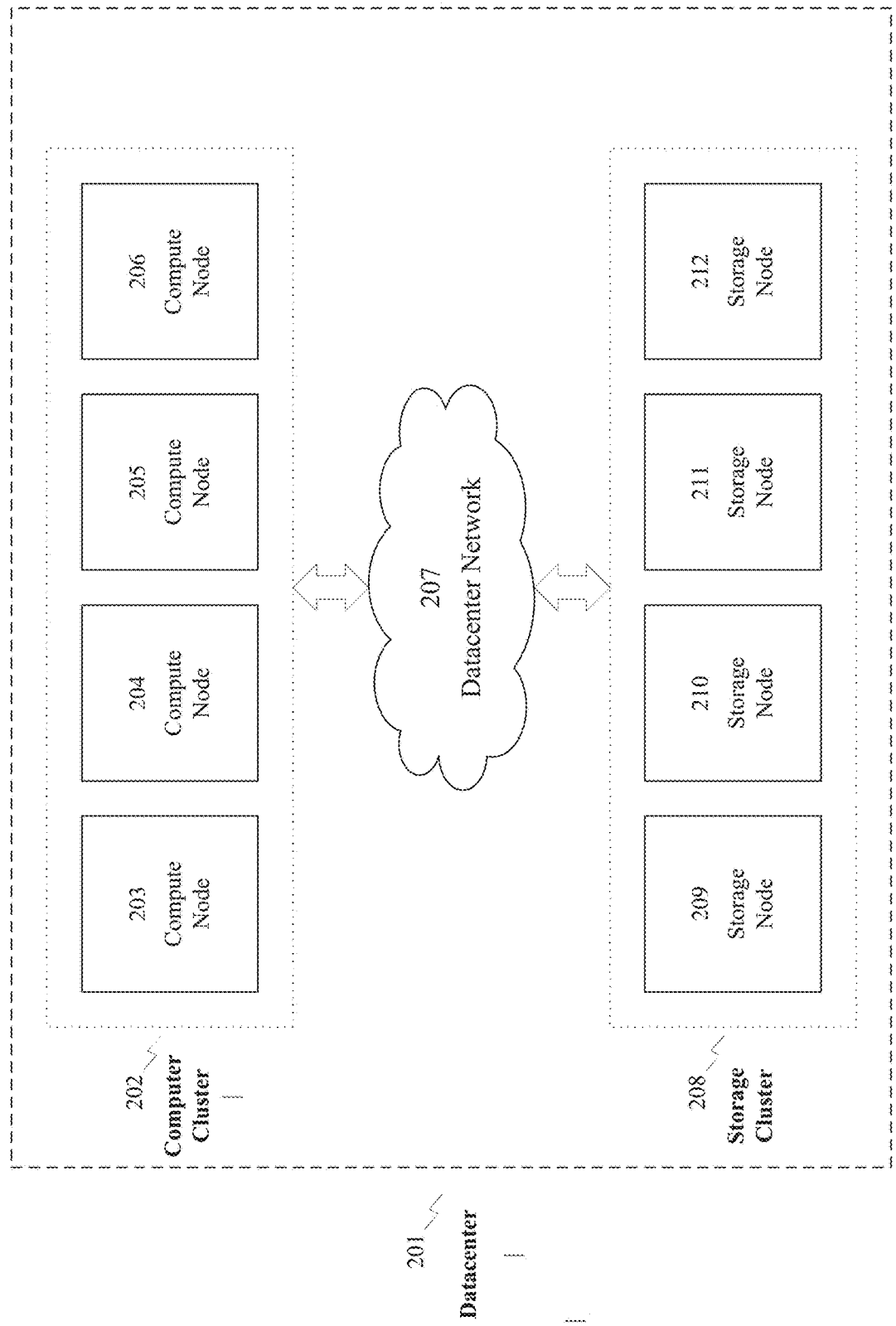
FIG. 2 is a schematic illustrating an example datacenter layout.

FIG. 2 is a schematic illustrating an example datacenter layout. As shown in FIG. 2, datacenter 201 comprises a computer cluster 202 and a storage cluster 208. Computer cluster 202 can include various compute nodes, such as compute nodes 203, 204, 205, and 206. Similarly, storage cluster 208 can include storage nodes, such as storage nodes 209, 210, 211, and 212. Computer cluster 202 and storage cluster 208 can be connected to each other via datacenter network 206. Not shown is the intra-cluster communication channels that couple compute nodes 203, 204, 205, and 206 to each other or the intra cluster communication channels that couple storage nodes 209, 210, 211, and 212 to each other. Note also that, in general, datacenter 201 may be composed of multiple computer clusters and storage clusters.

As shown in FIG. 2, there is a separation between storage and computing. The primary data storage can be moved out from a compute server and connected through network with the compute nodes. As a result, the extended distance poses challenges on system performance in terms of task accomplishment capability, which further depends on the storage performance (e.g., latency, throughput, etc.) and the compute performance (e.g., core utilization, process time, etc.).

Figure 3:
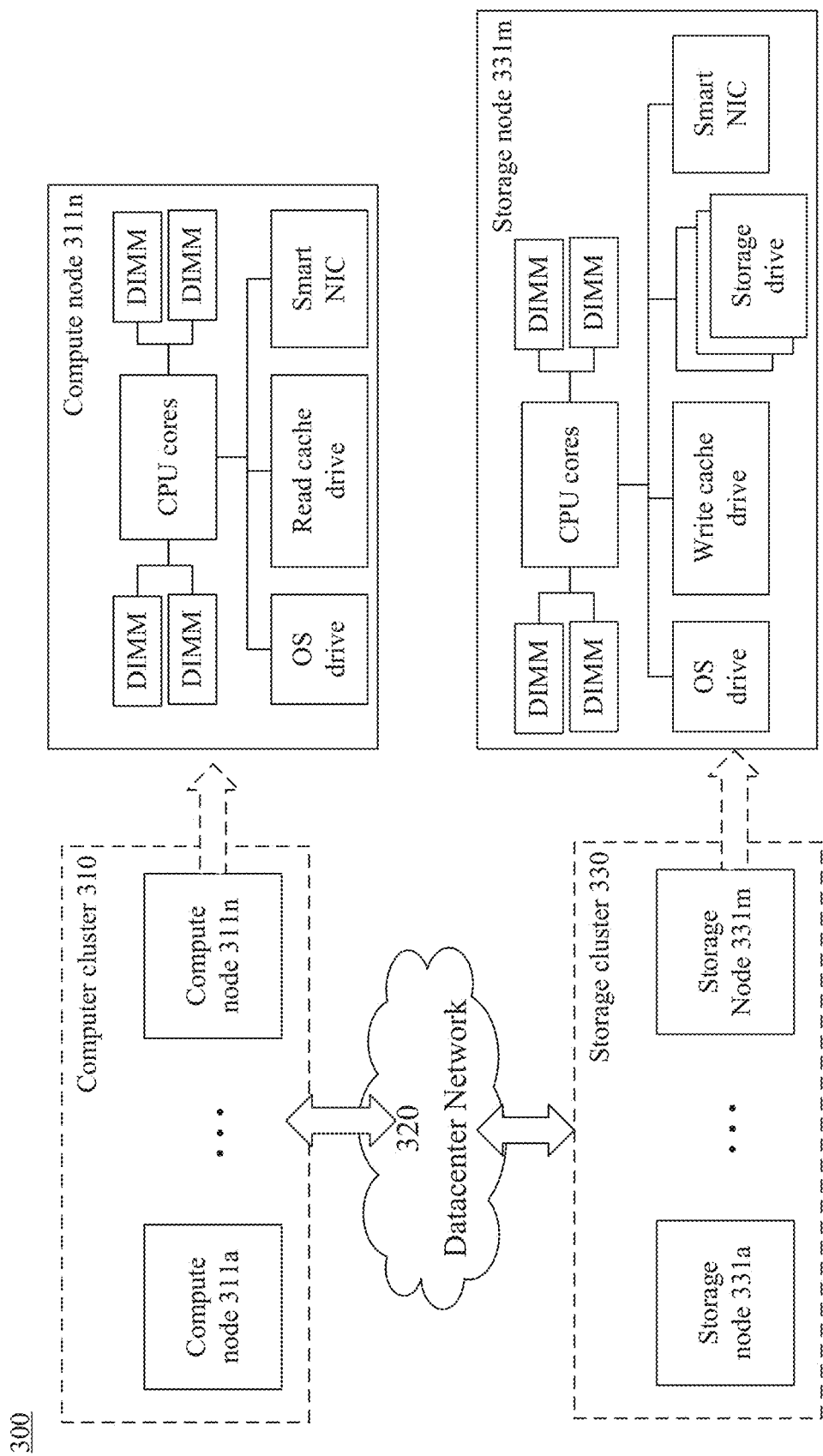
FIG. 3 is a schematic illustrating an example datacenter with write cache in a storage node and read cache in a compute node, according to some embodiments of the present disclosure.

A straightforward solution is to shorten the distance. FIG. 3 is a schematic illustrating an example datacenter with write cache in a storage node and read cache in a compute node, according to some embodiments of the present disclosure. As shown in FIG. 3, computer cluster 310 can be communicatively coupled with storage cluster 330 via datacenter network 320. In some embodiments, storage cluster can run a distributed file system to ensure high storage availability and data consistency, and the read cache can achieve local data buffering for hot data. As shown in FIG. 3, compute node 311n of computer cluster 310 can comprise a read cache drive, and storage node 331m of storage cluster 330 can comprise a write cache drive.

There are a number of issues with the system disclosed in FIG. 3. First, the read cache is a local storage. As a result, the read cache of one compute node may not be shared with other compute nodes 311 in computer cluster 310. Second, the write cache of a storage node can be global, but the write cache is not close to computer cluster 310. Therefore, the latency to securely write data into write cache is long due to considerable IO path.

Figure 4:
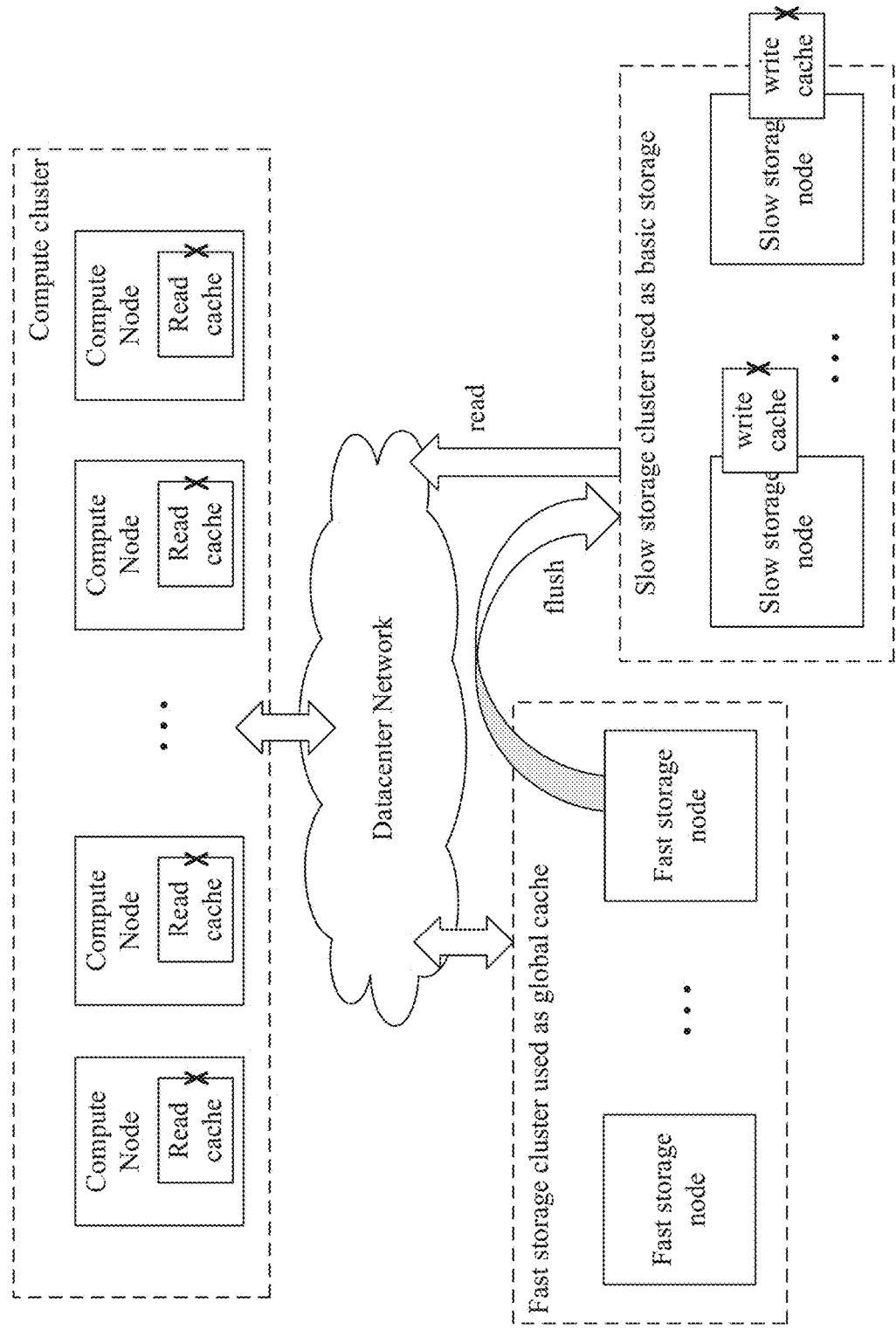
FIG. 4 is an illustration of an example system with a global cache, according to some embodiments of the present disclosure.

Embodiments of the present disclosure provide methods and systems with a global cache and an acceleration layer to improve on the issues described above. FIG. 4 is an illustration of an example system with a global cache, according to some embodiments of the present disclosure. As shown in FIG. 4, the original read cache in the compute node and the original write cache in the storage node can be merged together to form a global cache. As a result, in some embodiments, the original read cache in the compute nodes and the original write cache in the storage nodes are no longer needed and may be removed. In some embodiments, the global cache can perform at a lower access latency using fast storage media (e.g., NAND flash, 3D Xpoint, etc.). In some embodiments, the global cache can buffer the write IOs from one or more users or clients. The global cache may merge the data from the write IOs, and later flush the merged data into a basic storage. In some embodiments, the merged data can be flushed with a large block size. Compared with the drives in the storage nodes, cache drives in the global cache provide advantages of high bandwidth and low latency, and low capacity that is able to balance the total cost of ownership ("TCO") by using limited capacity of relatively more expensive storage media.

Figure 5:
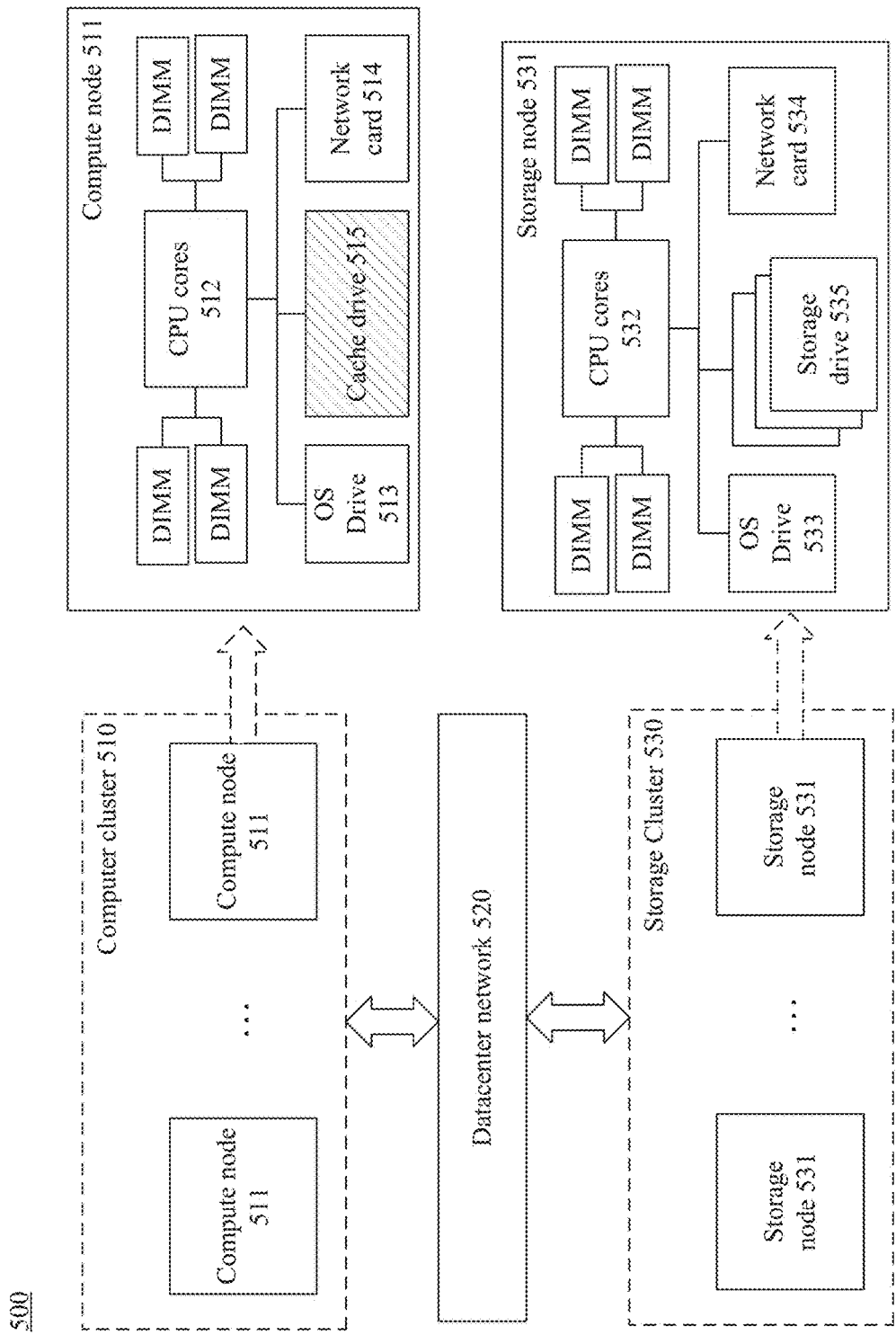
FIG. 5 is an illustration of an example system with a cache drive, according to some embodiments of the present disclosure.

In some embodiments, instead of deploying another cluster as the global cache (e.g., global cache shown in FIG. 4), the system can incorporate an add-in storage card with both storage capacity and compute capability. FIG. 5 is an illustration of an example system with a cache drive, according to some embodiments of the present disclosure. As shown in FIG. 5, computer cluster 510 in datacenter 500 comprises one or more compute nodes (e.g., compute servers) 511. Compute node 511 can comprise a cache drive 515. In some embodiments, logically, cache drive 515 has similar functionalities as the global cache shown in FIG. 4. Physically, cache drive 515 can be a device installed in compute nodes 511, such as in a storage flash card.

In some embodiments, cache drive 515 can be plugged into a bus slot on the compute node. For example, the cache drive can be an add-in storage card plugged into a peripheral component interconnect express ("PCIe") slot on the compute node. In some embodiments, the cache drive can share a network card 514 (e.g., smart NIC) with the compute node. For example, network card 514 can comprise two circuitries. The first circuitry can be assigned to the cache drive, and the second circuitry can be assigned to the compute node, such as CPU cores 512 in compute node 511. When compute node 511 needs to communicate with other compute nodes 511 in computer cluster 510 or storage nodes 531 in storage cluster 530, both cache drive 515 and CPU cores 512 in compute node 511 can send or receive communication requests via network card 514. In some embodiments, the network card 514 is communicatively coupled to datacenter network 520, which can provide data access between compute nodes 511 or storage nodes 531. As a result, the system can reduce the cost associated with the rack space for the global cache layer with standalone servers and the cost associated with ethernet ports in network switches.

In some embodiments, the bus slot in compute node 511 hosting cache drive 515 can provide lower latency than the network communication between computer cluster 510 and storage cluster 530, hence further increasing the efficiency for operations on cache drive 515. In some embodiments, techniques including direct memory access ("DMA") and zero-copy can also be applied to cache drive 515 to further reduce the overall resource consumption.

Figure 6:
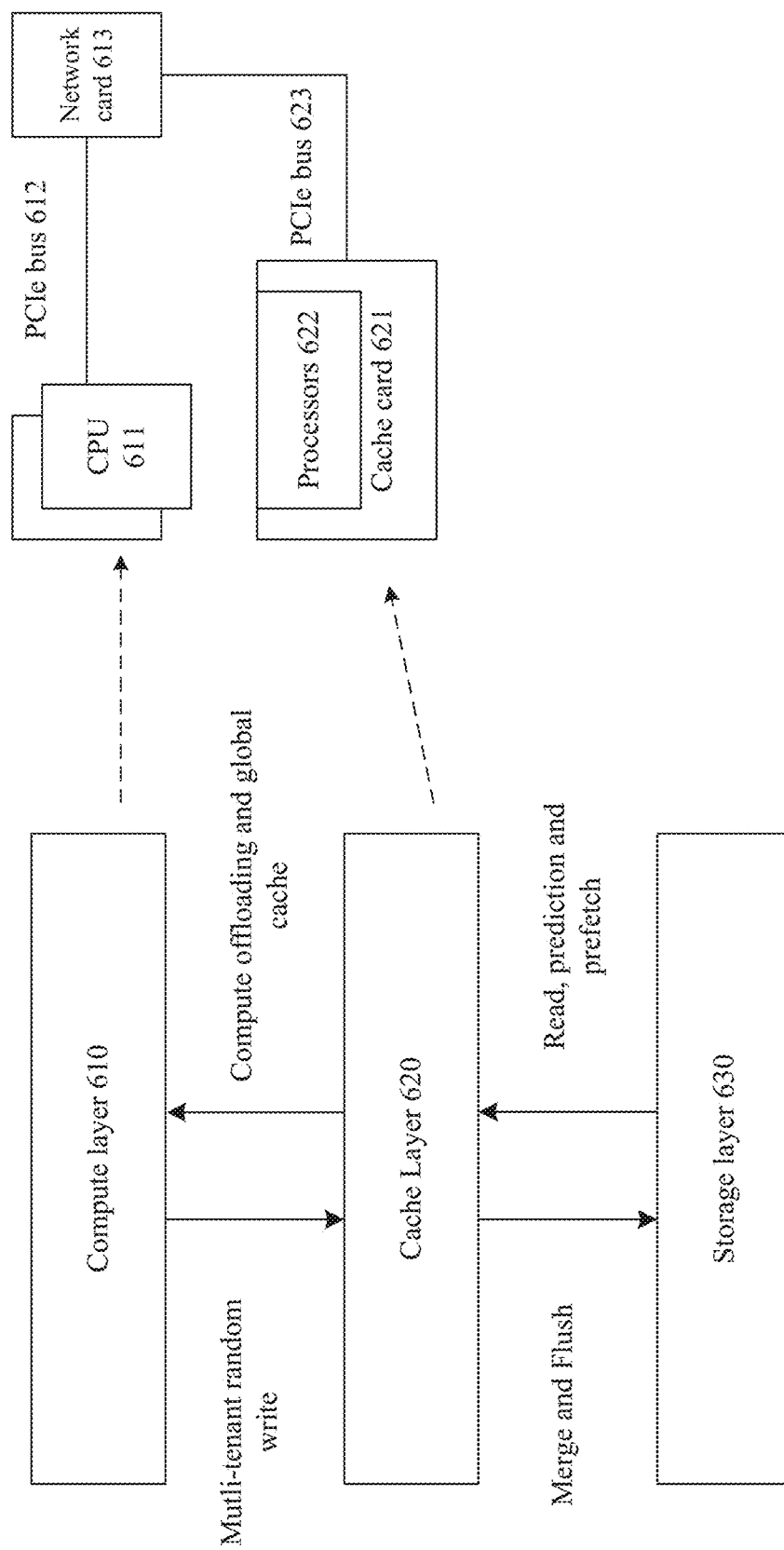
FIG. 6 is an illustration of an example cache layer with accelerated communications, according to some embodiments of the present disclosure.

In some embodiments, cache drive 515 shown in FIG. 5 can be used as a logical cache layer between a compute layer (e.g., computer cluster) and a storage layer (e.g., storage cluster). The cache layer can provide accelerated IO communications between the compute layer and the storage layer. FIG. 6 is an illustration of an example cache layer with accelerated communications, according to some embodiments of the present disclosure. As shown in FIG. 6, there can be different types of IO communications between a compute layer 610, a cache layer 620, and a storage layer 630. In some embodiments, compute layer 610 comprises one or more CPUs 611, similar to CPU cores 512 in compute node 511 shown in FIG. 5. In some embodiments, cache layer 620 comprises cache card 621, similar to cache drive 515 shown in FIG. 5. In some embodiments, as shown in FIG. 6, CPUs 611 and cache card 621 are a part of a compute node (e.g., compute node 511 of FIG. 5), and CPUs 611 and cache card 621 are communicatively coupled via PCIe buses 612 and 623 and a network card 613. In some embodiments, network card 613 is similar to network card 514 shown in FIG. 5.

In some embodiments, as shown in FIG. 6, compute layer 610 can send write requests to cache layer 620. In some embodiments, the write requests comprise multi-tenant random writes. In other words, the write requests can come from different users, systems or files, and the write requests can be randomly ordered or received. When write requests are received in cache layer 620, cache layer 620 can merge data from the same user, system or file together. Cache layer 620 can then flush the merged data into storage layer 630.

In some embodiments, as shown in FIG. 6, cache layer 620 can read data from storage layer 630 according to a read operation compute layer 510. The data read from storage layer 630 can be stored or cached in cache layer 620 to provide quicker read access for compute layer 610. In some embodiments, as shown in FIG. 6, cache layer 620 can predictively load the data from storage layer 630 before the actual read requests issued by compute layer 610. For example, an application may be reading a first part of one data set intensively, and the data can be cached or stored in cache layer 620. Based on data analysis on the read operations (e.g., a heuristic analysis), other parts of data set can be tentatively prefetched into cache layer 620 from storage layer 630 to enhance the cache hit rate.

Figure 7:
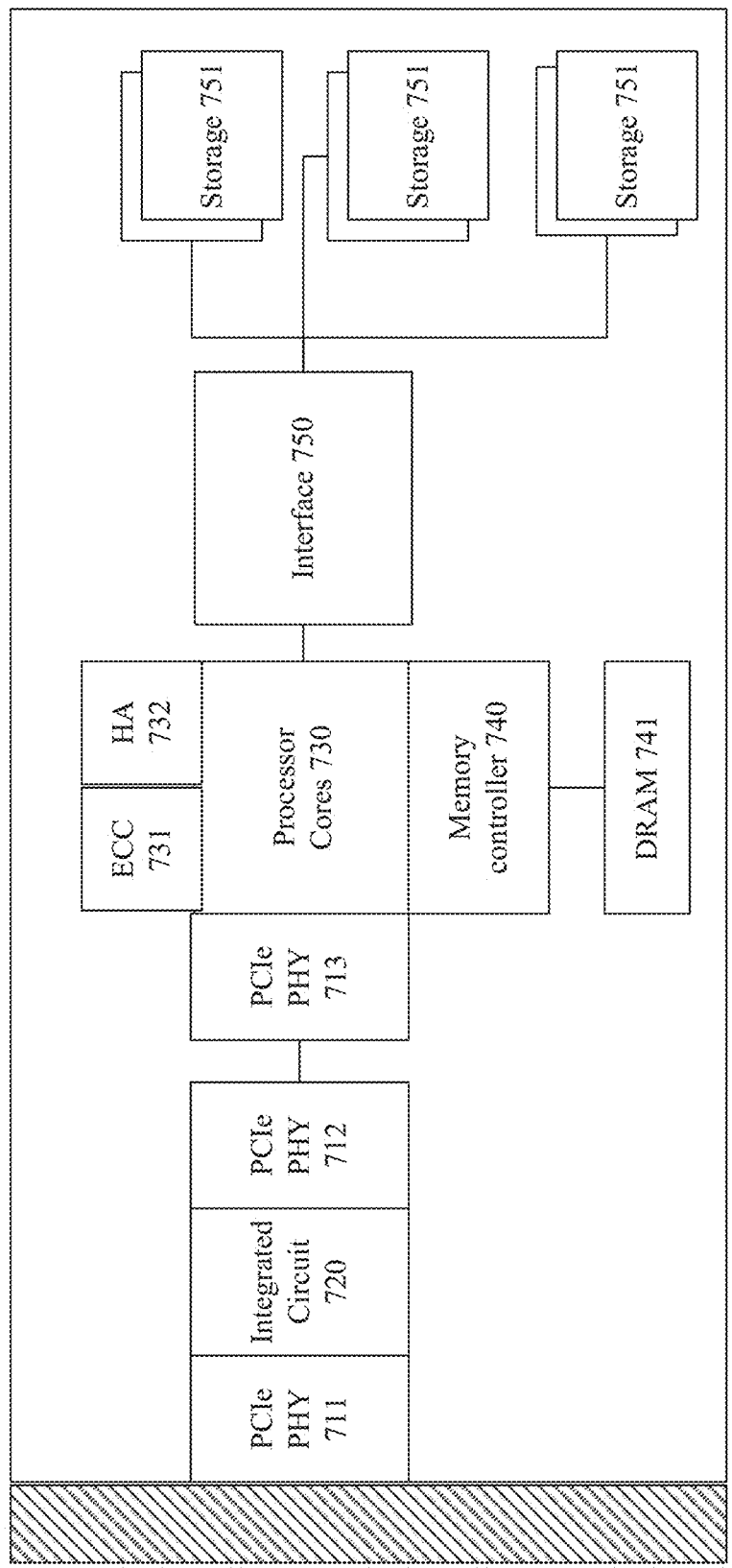
FIG. 7 is an illustration of an example cache drive with processing units, according to some embodiments of the present disclosure.

In some embodiments, the cache drive can include processing units for data processing. FIG. 7 is an illustration of an example cache drive with processing units, according to some embodiments of the present disclosure. It is appreciated that cache drive 700 shown in FIG. 7 can be implemented in a similar fashion as cache drive 515 shown in FIG. 5 or cache layer 620 shown in FIG. 6. As shown in FIG. 7, cache drive 700 can comprise PCIe physical layers 711, 712, and 713, which can be collectively referred to as cache drive 700's IO interface. In some embodiments, cache drive 700 can comprise integrated circuit 720. Integrated circuit 720 can implement customized functions for processing data. For example, integrated circuit 720 can perform computing processes or computing functions such as sorting, filtering, and searching on the data stored in cache drive 700. In some embodiments, integrated circuit 720 can be implemented as a field-programmable gated array ("FPGA") or an application-specific integrated circuit ("ASIC").

In some embodiments, cache drive 700 can comprise one or more processor cores 730. Processor cores 730 can be configured to run embedded firmware to accomplish some offloaded compute work. In some embodiments, processor cores 730 can perform the computing functions similar to integrated circuit 720. In some embodiments, cache drive 700 can comprise a hardware accelerator 732 (annotated as "HA" in FIG. 7). Hardware accelerator 732 can be configured to perform, for example, cyclic redundancy checks ("CRC"), encryptions, RAID encoding, or error correction code ("ECC") encoding on the data stored in cache drive 700. In some embodiments, hardware accelerator 732 can be configured to compliment integrated circuit 720 in performing computing functions. For example, for computing functions that are more standard, hardware accelerator 732 can perform the computing functions. For computing functions that are more customized (e.g., data compression), integrated circuit 720 can perform the computing functions. In some embodiments, cache drive 700 can comprise interface 750, which can be configured to handle protocols to communicate with flash media or one or more cache storage 751. In some embodiments, interface 750 is a NAND interface, and one or more cache storage 751 are NAND flash media. It is appreciated that processor cores 730, integrated circuit 720, and hardware accelerator 732 can be generally referred to as processing units in cache drive 700.

Figure 8:
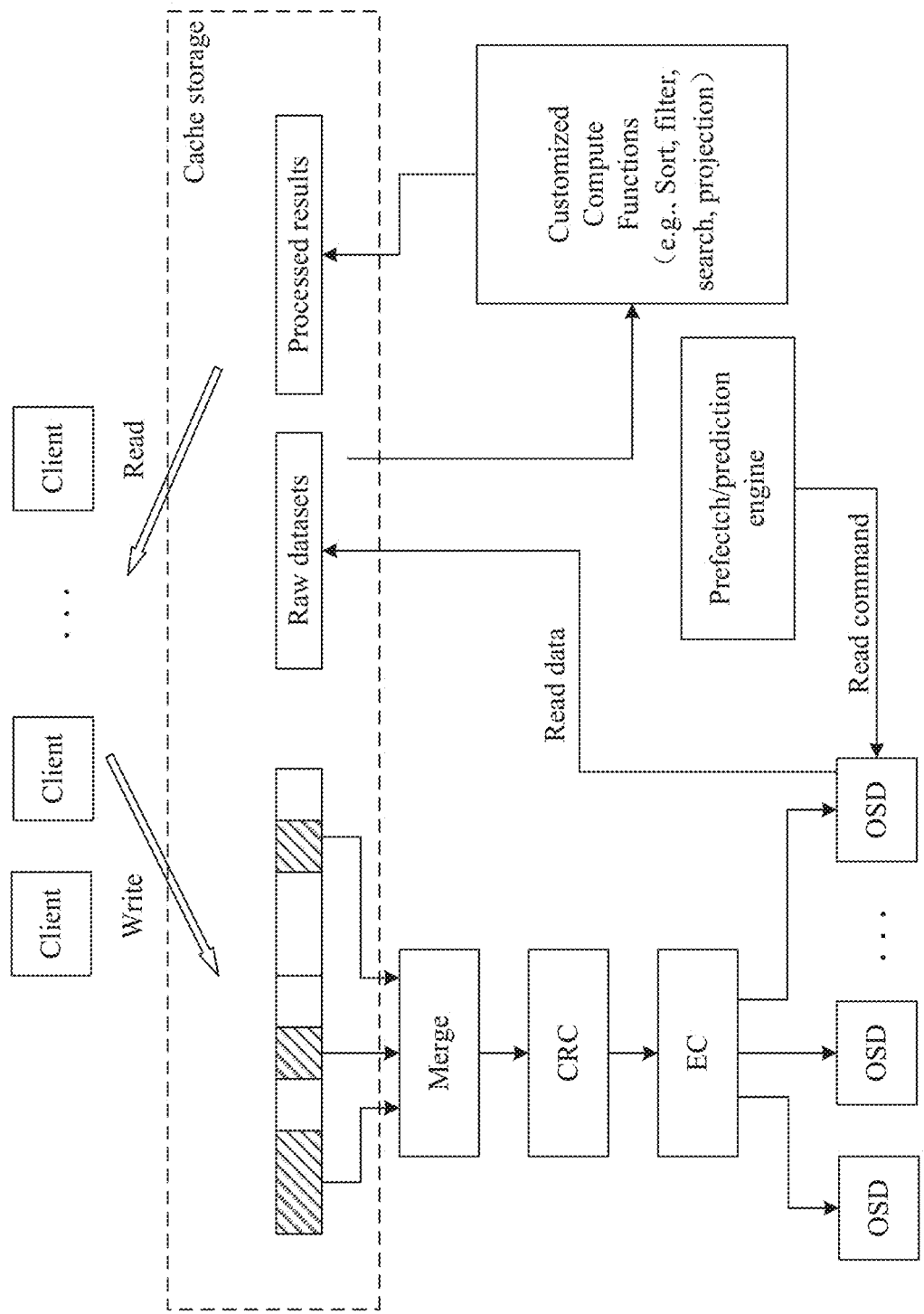
FIG. 8 is an illustration of an example operation of an accelerated cache drive, according to some embodiments of the present disclosure.

FIG. 8 is an illustration of an example operation of an accelerated cache drive, according to some embodiments of the present disclosure. As shown in FIG. 8, one or more users or clients can initiate read or write operations on an accelerated cache drive (e.g., cache drive 700 of FIG. 7). It is appreciated that the operation shown in FIG. 8 can be executed on cache drive 515 of FIG. 5 or cache drive 700 of FIG. 7.

In some embodiments, the one or more clients can initiate write operations on the accelerated cache drive concurrently. For example, the one or more clients can initiate write operations to store data in the cache storage, and the data from different clients can be stored in segments that are ordered randomly. In some embodiments, the one or more clients can be one or more different files, and the files can be from one client. For example, file A may be divided into subparts A1-A4, file B may be divided into subparts B1-B3, and file C may be divided into sub parts C1-C4. When files A-C are received in the accelerated cache drive, the order of the subparts may be random (e.g., subparts may be ordered as A1-A2-B1-C1-C2-B2-A3-B3-C3-C4-A4). In some embodiments, the one or more clients or the one or more files may be updated in time, and the update data can be appended to the stored data. For example, if subpart B1 was updated after files A-C have been stored in the accelerated cache drive, the updated version of B1 can be appended to the files A-C.

In some embodiments, when the data from the cache storage is to be written into one or more object storage devices ("OSDs"), one or more computing functions can be performed on the data. For example, as shown in FIG. 8, the computing functions can include data merging, CRC, and error coding ("EC") encoding. The data merging can collect data segments or subparts from a same client or a same file and place the data segments or subparts together. For example, referring to the previously discussed files A-C, since the subparts are stored randomly, the data merging can collect all subparts for file A, and merge the subparts together to reconstruct file A. In some embodiments, the data merging can also remove obsolete versions of the data. For example, if subpart B1 was updated, only the most recent version of subpart B1 is kept in the data merging.

In some embodiments, the CRC can detect accidental changes in raw data. The EC encoding can provide data protection by encoding the data with redundant data pieces. The computing functions allow the accelerated cache drive to provide persistent storage to counteract single points of failures.

In some embodiments, the accelerated cache drive can be configured to keep multiple copies of the data for short write latency. In some embodiments, when the data is flushed into the drives (e.g., storage nodes 531 of FIG. 5) in the storage cluster (e.g., storage cluster 530 of FIG. 5), such as the OSD shown in FIG. 6, data with EC encodings can be spread onto multiple storage nodes according to partition rules. In some embodiments, microprocessors in the accelerated cache drive (e.g., processor cores 730 of FIG. 7) can execute the firmware.

In some embodiments, when the one or more clients initiate a read operation on the data stored in the storage cluster, the cache storage can be checked to determine if the data is available in the cache storage. If the data is available, the cache storage can provide the data for the read operation. In some embodiments, if the data is not available in the cache storage, raw data set can be read from the OSDs and stored in the cache storage for faster read operations. In some embodiments, the raw data stored in the cache storage can undergo one or more customized compute functions, such as sorting, filtering, and searching on the data. The data processed by the one or more customized compute functions can be stored in the cache storage to enable more efficient reading operations. In some embodiments, an integrated circuit in the accelerated cache drive (e.g., integrated circuit 720 of FIG. 7) can implement logic circuit for the customized compute functions on the data.

In some embodiments, when raw data is read out from the OSDs and stored in the cache storage, the accelerated cache drive can further perform prediction operations to determine potential data for data prefetching. Data prefetching is a technique that can fetch data into the cache storage before the data is actually needed. The prefetched data can also be stored in the cache storage. In some embodiments, the prediction operations can be performed in parallel using dynamic analysis that is carried out with the microprocessor firmware.

Embodiments of the present disclosure provide an accelerated cache drive as a middle layer between the computer cluster and the storage cluster. The accelerated cache drive can be physically deployed in the compute servers. The accelerated cache drive can operate as the global cache, enlarge the read cache capacity, and empower the predictive fetch for improving cache hit rates. Moreover, the accelerated cache drive can shorten the write latency and reformat the IO pattern to be more friendly for storing data in the low-cost drives in the storage cluster. The accelerated cache drive merges the originally isolated read cache in compute node and the write cache in storage node. The integrated circuit and the microprocessors can perform general or customized compute tasks to enhance the cache drive's overall processing capability.

Figure 9:
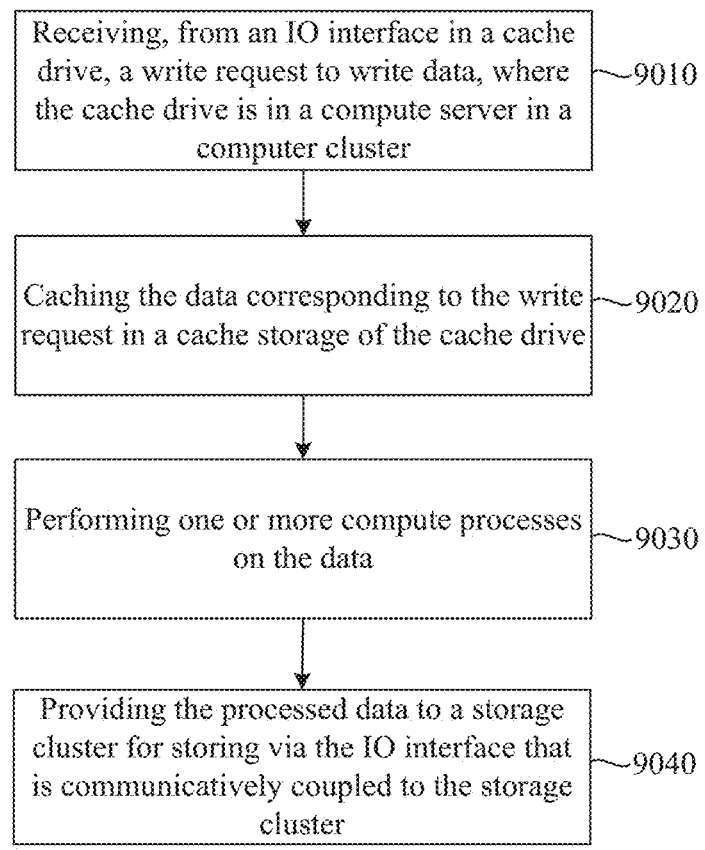
FIG. 9 is an example flowchart of performing data operations on an accelerated cache drive, according to some embodiments of the present disclosure.

Embodiments of the present disclosure further provide a method for performing data operations on the accelerated cache drive. FIG. 9 is an example flowchart of performing data operations on an accelerated cache drive, according to some embodiments of the present disclosure. It is appreciated that method 9000 shown in FIG. 9 can be performed by cache drive 515 of FIG. 5, cache layer 620 of FIG. 6, and cache drive 700 of FIG. 7.

In step S9010, a write request to write data is received from an IO interface of a cache drive. The cache drive (e.g., cache drive 515 of FIG. 5, cache layer 620 of FIG. 6, and cache drive 700 of FIG. 7) is in a compute server (e.g., compute node 511) of a computer cluster (e.g., computer cluster 510, and the computer cluster is a part of a datacenter (e.g., datacenter 500). In some embodiments, the write request can be from a plurality of clients or users, or a plurality of different files. In some embodiments, the cache drive is communicatively coupled with other parts of the compute server (e.g., CPU cores 512 of compute node 511 shown in FIG. 5) via PCIe. In some embodiments, the cache drive is communicatively coupled with a network card in the compute server (e.g., network card 514 of FIG. 5 or network card 613 of FIG. 6), and the cache drive can communicate with a plurality of other compute servers in the computer cluster or a plurality of storage nodes (e.g., storage nodes 531 of FIG. 5) in a storage cluster via the network card 514 and a datacenter network (e.g., datacenter network 520 of FIG. 5).

In step 9020, the data that corresponds to the write request is cached in a cache storage of the cache drive. The cache storage is configured to store data. In some embodiments, the cache storage is a fast storage media (e.g., NAND flash, 3D Xpoint, etc.). In some embodiments, the data cached or stored in the cache storage can be used to provide fast data access to the plurality of clients or users. In some embodiments, the data cached or stored in the cache storage can serve as a global cache for the plurality of compute servers in the computer cluster.

In step 9030, one or more compute processes are performed on the data. In some embodiments, the one or more compute processes are performed by processing units of the cache drive. For example, the processing units can include integrated circuits (e.g., integrated circuit 720 of FIG. 7), processors cores (e.g., processor cores 730 of FIG. 7), or hardware accelerator (e.g., hardware accelerator 732 of FIG. 7). In some embodiments, the one or more compute processes include performing CRC, RAID encoding, or ECC encoding on the cached data. In some embodiments, the one or more compute processes further comprises merging segments or subparts of the data. For example, as shown in FIG. 8, the cached data may include segments or subparts from different clients or files, and the segments or subparts may be ordered randomly. The data merging can collect all segments from a same client or all subparts for a single file and can merge the segments and subparts together. In some embodiments, the data merging can also remove obsolete versions or parts of the data.

In step 9040, the processed data is provided to the storage cluster for storing. In some embodiments, the processed data is stored in the storage cluster after the one or more compute processes have been performed on the data. In some embodiments, the storage cluster can run a distributed file system to ensure high storage availability and data consistency. In some embodiments, storage nodes in the storage cluster comprises storage disks that are slower and more cost effective than the cache storage of the cache drive.

Figure 10:
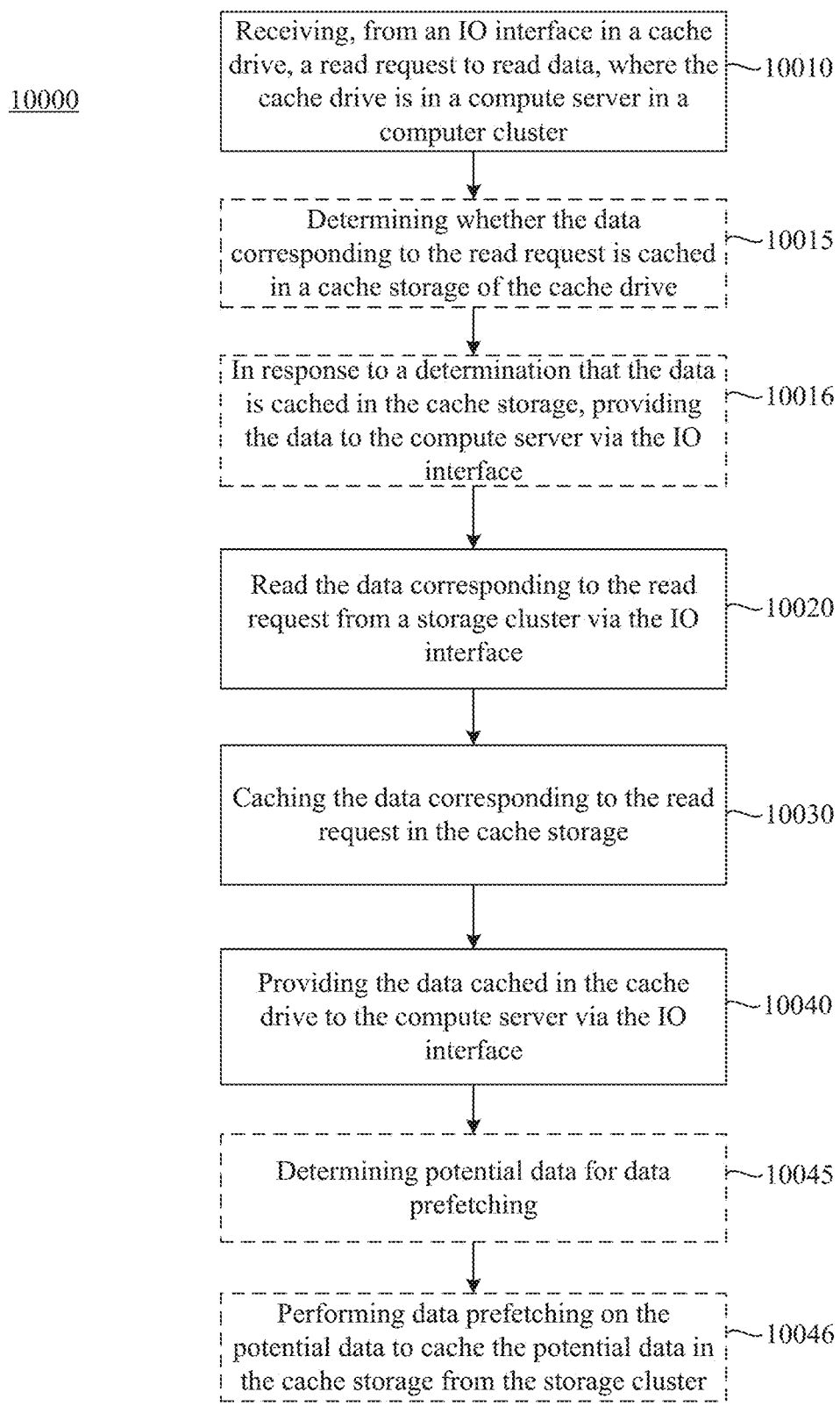
FIG. 10 is an example flowchart of performing data operations on an accelerated cache drive as a read cache, according to some embodiments of the present disclosure.

Embodiments of the present disclosure further provide a method for performing data operations on the accelerated cache drive as a read cache. FIG. 10 is an example flowchart of performing data operations on an accelerated cache drive as a read cache, according to some embodiments of the present disclosure. It is appreciated that method 10000 shown in FIG. 10 can be performed by cache drive 515 of FIG. 5, cache layer 620 of FIG. 6, and cache drive 700 of FIG. 7. It is also appreciated that a cache drive that is capable of performing method 9000 can also be configured to perform method 10000.

In step 10010, a read request is received to read data from a storage cluster. In some embodiments, the read request is received via an IO interface of the cache drive. The cache drive (e.g., cache drive 515 of FIG. 5, cache layer 620 of FIG. 6, and cache drive 700 of FIG. 7) is in a compute server (e.g., compute node 511) of a computer cluster (e.g., computer cluster 510, and the computer cluster is a part of a datacenter (e.g., datacenter 500). In some embodiments, the read request can be from a plurality of clients or users. In some embodiments, the cache drive is communicatively coupled with other parts of the compute node (e.g., CPU cores 512 of compute node 511 shown in FIG. 5) via PCIe. In some embodiments, the cache drive is communicatively coupled with a network card in the compute node (e.g., network card 514 of FIG. 5 or network card 613 of FIG. 6), and the cache drive can communicate with a plurality of other compute nodes in the computer cluster or a plurality of storage nodes (e.g., storage nodes 531 of FIG. 5) in the storage cluster via the network card 514 and a datacenter network (e.g., datacenter network 520 of FIG. 5).

In some embodiments, in response to receiving the data request, optional steps 10015 and 10016 can be executed. In step 10015, it is determined whether the data corresponding to the read request is cached in a cache storage of the cache drive. In step 10016, in response to a determination that the data corresponding to the read request is cached in the cache storage, the cached data can be provided to the compute server via the IO interface. In some embodiments, the data can be provided to one or more clients communicatively coupled to the cache drive in the datacenter. In some embodiments, the data can be provided to a plurality of other compute servers in the computer cluster.

Referring back to FIG. 10, in step 10020, the data corresponding to the read request is read from the storage cluster via the IO interface. In some embodiments, the storage cluster can run a distributed file system to ensure high storage availability and data consistency. In some embodiments, storage nodes in the storage cluster comprises storage disks that are slower and more cost effective than the cache storage of the cache drive.

In step 10030, the data corresponding to the read request is cached in a cache storage of the cache drive. The cache storage is configured to store data. In some embodiments, the cache storage is a fast storage media (e.g., NAND flash, 3D Xpoint, etc.). In some embodiments, the data cached or stored in the cache storage can be used to provide fast data access to the plurality of clients or users.

In step 10040, the data cached in the cache storage is provided to the compute server via the IO interface. In some embodiments, the data can be provided to one or more clients communicatively coupled to the cache drive in the datacenter. In some embodiments, the data can be provided to a plurality of other compute servers in the computer cluster.

In some embodiments, in response to receiving the read request, optional steps 10045 and 10046 can be executed. In step 10045, potential data for data prefetching from the storage cluster is determined. In step 10046, data prefetching can be performed on the potential data to cache the potential data in the cache storage from the storage cluster.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The data storage system, secondary storage unit, other functional units described in this disclosure can be implemented by hardware, or software, or a combination of hardware and software. One of ordinary skill in the art will also understand that multiple ones of the above described functional units may be combined as one functional unit, and each of the above described functional units may be further divided into a plurality of functional sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

The embodiments may further be described using the following clauses:

1. A method of operating a cache drive in a compute server of a computer cluster, the method comprising:
receiving, from an IO interface in the cache drive of the compute server, a write request to write data;
caching the data corresponding to the write request in a cache storage of the cache drive of the compute server;
performing one or more compute processes on the data; and
in response to performing the one or more compute processes on the data, providing the processed data to a storage cluster for storing via the IO interface that is communicatively coupled to the storage cluster.

2. The method of clause 1, wherein:
the one or more compute processes are performed by one or more processing units in the cache drive; and
the compute processes comprise cyclic redundancy checks, redundant array of independent disks encoding, or error correction code encoding.

3. The method of clause 1 or 2, wherein:
receiving, from the IO interface in the cache drive, the write request to write data further comprises receiving the write request to write data from a plurality of clients; and
performing one or more computer processes further comprises merging data from one client in the plurality of clients.

4. The method of clause 3, wherein:
the data corresponding to the write request comprises a plurality of segments ordered randomly from the plurality of clients; and
performing one or more computer processes further comprises locating one or more segments from the plurality of segments, wherein the one or more segments are from the one client in the plurality of clients.

5. The method of any one of clauses 1-4, further comprising:
receiving, from the IO interface, a read request to read data from the storage cluster;
reading the data corresponding to the read request from the storage cluster via the IO interface;
caching the data corresponding to the read request in the cache storage; and
providing the data cached in the cache drive to the compute server via the IO interface.

6. The method of clause 5, further comprising:
providing the data cached in the cache drive to a plurality of other compute servers in the computer cluster.

7. The method of clause 5 or 6, further comprising:
providing the data cached in the cache drive to a plurality of clients communicatively coupled to the cache drive.

8. The method of any one of clauses 5-7, further comprising:
in response to receiving the read request, determining whether the data corresponding to the read request is cached in the cache storage; and
in response to a determination that the data corresponding to the read request is cached in the cache storage, providing the data cached in the cache drive to the computer server via the IO interface.

9. The method of any one of clauses 5-8, further comprising:
in response to receiving the read request, determining potential data for data prefetching from the storage cluster; and
performing data prefetching on the potential data to cache the potential data in the cache storage.

10. The method of any one of clauses 1-9, wherein the cache drive is communicatively coupled with the computer cluster and the storage cluster via a network card in the compute server.

11. The method of any one of clauses 1-10, wherein:
the cache storage comprises one or more flash drives.

12. A non-transitory computer readable medium that stores a set of instructions that is executable by at least one processor of a cache drive to cause the cache drive to perform a method, the method comprising:
receiving, from an IO interface in the cache drive of the compute server, a write request to write data;
caching the data corresponding to the write request in a cache storage of the cache drive of the compute server;
performing one or more compute processes on the data; and
in response to performing the one or more compute processes on the data, providing the processed data to a storage cluster for storing via the IO interface that is communicatively coupled to the storage cluster.

13. A compute server in a computer cluster, the compute server comprising:
a cache drive, comprising:
  a cache storage configured to store data;
  an IO interface communicatively coupled to the computer cluster and a storage cluster; and
  one or more processing units communicatively coupled to the cache storage and the IO interface, wherein the one or more processors are configured to cause the cache drive to:
    receive, from the IO interface, a write request to write data;
    cache the data corresponding to the write request in the cache storage;
    perform one or more compute processes on the data; and
    in response to performing the one or more compute processes on the data, provide the processed data to the storage cluster for storing via the IO interface.

14. The compute server of clause 13, wherein:
the compute processes comprise cyclic redundancy checks, redundant array of independent disks encoding, or error correction code encoding.

15. The compute server of clause 13 or 14, wherein the one or more processing units are further configured to:
receive the write request to write data from a plurality of clients, wherein the one or more compute processes further comprise a merging data from one client in the plurality of clients.

16. The compute server of any one of clauses 13-15, wherein:
the data corresponding to the write request comprises a plurality of segments ordered randomly from the plurality of clients; and
the one or more compute processes further comprise a locating of one or more segments from the plurality of segments, wherein the one or more segments are from the one client in the plurality of clients.

17. The compute server of any one of clauses 13-16, wherein the one or more processing units are further configured to cause the cache drive to:
receive, from the IO interface, a read request to read data from the storage cluster;
read the data corresponding to the read request from the storage cluster via the IO interface;
cache the data corresponding to the read request in the cache storage; and
provide the data cached in the cache drive to the compute server via the IO interface.

18. The compute server of clause 17, wherein the one or more processing units are further configured to cause the cache drive to:
in response to receiving the read request, determine whether the data corresponding to the read request is cached in the cache storage; and
in response to a determination that the data corresponding to the read request is cached in the cache storage, provide the data cached in the cache drive to the compute server via the IO interface.

19. The compute server of clause 17 or 18, wherein the one or more processing units are further configured to cause the cache drive to:
in response to receiving the read request, determine potential data for data prefetching from the storage cluster; and
perform data prefetching on the potential data to cache the potential data in the cache storage.

20. The compute server of any one of clauses 13-19, wherein the cache drive is communicatively coupled with the computer cluster and the storage cluster via a network card in the compute server.

21. The compute server of any one of clauses 13-20, wherein the cache storage comprises one or more flash drives.

22. A cache drive in a compute server of a computer cluster, the cache drive comprising:
a cache storage configured to store data;
an IO interface communicatively coupled to the computer cluster and a storage cluster; and
one or more processing units communicatively coupled to the cache storage and the IO interface, wherein the one or more processors are configured to cause the cache drive to:
  receive, from the IO interface, a write request to write data;
  cache the data corresponding to the write request in the cache storage;
  perform one or more compute processes on the data; and
  in response to performing the one or more compute processes on the data, provide the processed data to the storage cluster for storing via the IO interface.

23. The cache drive of clause 22, wherein:
the compute processes comprise cyclic redundancy checks, redundant array of independent disks encoding, or error correction code encoding.

24. The cache drive of clause 22 or 23, wherein the one or more processing units are further configured to:
receive the write request to write data from a plurality of clients, wherein the one or more compute processes further comprise a merging of data from one client in the plurality of clients.

25. The cache drive of any one of clauses 22-24, wherein:
the data corresponding to the write request comprises a plurality of segments ordered randomly from the plurality of clients; and
the one or more compute processes further comprise a locating of one or more segments from the plurality of segments, wherein the one or more segments are from the one client in the plurality of clients.

26. The cache drive of any one of clauses 22-25, wherein the one or more processing units are further configured to cause the cache drive to:
receive, from the IO interface, a read request to read data from the storage cluster;
read the data corresponding to the read request from the storage cluster via the IO interface;
cache the data corresponding to the read request in the cache storage; and
provide the data cached in the cache drive to the compute server via the IO interface.

27. The cache drive of clause 26, wherein the one or more processing units are further configured to cause the cache drive to:
in response to receiving the read request, determine whether the data corresponding to the read request is cached in the cache storage; and
in response to a determination that the data corresponding to the read request is cached in the cache storage, provide the data cached in the cache drive to the compute server via the IO interface.

28. The cache drive of clause 26 or 27, wherein the one or more processing units are further configured to cause the cache drive to:
in response to receiving the read request, determine potential data for data prefetching from the storage cluster; and
perform data prefetching on the potential data to cache the potential data in the cache storage.

29. The cache drive of any one of clauses 22-28, wherein the cache drive is communicatively coupled with the computer cluster and the storage cluster via a network card in the compute server.

30. The cache drive of any one of clauses 22-29, wherein the cache storage comprises one or more flash drives.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method of operating a cache drive in a compute server of a computer cluster, the method comprising:
receiving, from an IO interface in the cache drive of the compute server, a write request to write data comprising a plurality of segments ordered randomly from a plurality of clients;
caching the data corresponding to the write request in a cache storage of the cache drive of the compute server;
performing one or more compute processes on the data, wherein the one or more compute processes include:
locating one or more segments from the plurality of segments, wherein the one or more segments are from one client of the plurality of clients; and
merging data from the one or more segments, to merge the data from the one client of the plurality of clients; and
in response to performing the one or more compute processes on the data, providing the processed data to a storage cluster for storing via the IO interface in the cache drive that is communicatively coupled to the storage cluster.

2. The method of claim 1, wherein:
the one or more compute processes are performed by one or more processing units in the cache drive; and
the compute processes comprise cyclic redundancy checks, redundant array of independent disks encoding, or error correction code encoding.

3. The method of claim 1, further comprising:
receiving, from the IO interface in the cache drive, a read request to read data from the storage cluster;
reading the data corresponding to the read request from the storage cluster via the IO interface in the cache drive; and
caching the data corresponding to the read request in the cache storage; and
providing the data cached in the cache drive to the computer cluster via the IO interface in the cache drive.

4. The method of claim 3, further comprising:
providing the data cached in the cache drive to a plurality of other compute servers in the computer cluster.

5. The method of claim 3, further comprising:
providing the data cached in the cache drive to a plurality of clients communicatively coupled to the cache drive.

6. The method of claim 3, further comprising:
in response to receiving the read request, determining whether the data corresponding to the read request is cached in the cache storage; and
in response to a determination that the data corresponding to the read request is cached in the cache storage, providing the data cached in the cache drive to the computer cluster via the IO interface in the cache drive.

7. The method of claim 3, further comprising:
in response to receiving the read request, determining potential data for data prefetching from the storage cluster; and
performing data prefetching on the potential data to cache the potential data in the cache storage.

8. The method of claim 1, wherein the cache drive is communicatively coupled with the computer cluster and the storage cluster via a network card in the compute server.

9. The method of claim 1, wherein:
the cache storage comprises one or more flash drives.

10. A non-transitory computer readable medium that stores a set of instructions that is executable by at least one processor of a cache drive to cause the cache drive to perform a method, the method comprising:
receiving, from an IO interface in the cache drive of the compute server, a write request to write data comprising a plurality of segments ordered randomly from a plurality of clients;
caching the data corresponding to the write request in a cache storage of the cache drive of the compute server;
performing one or more compute processes on the data, wherein the one or more compute processes include:
locating one or more segments from the plurality of segments, wherein the one or more segments are from one client of the plurality of clients; and
merging data from the one or more segments, to merge the data from the one client of the plurality of clients; and
in response to performing the one or more compute processes on the data, providing the processed data to a storage cluster for storing via the IO interface in the cache drive that is communicatively coupled to the storage cluster.

11. A compute server in a computer cluster, the compute server comprising:
a cache drive, comprising:
a cache storage configured to store data;
an IO interface communicatively coupled to the computer cluster and a storage cluster; and
one or more processing units communicatively coupled to the cache storage and the IO interface, wherein the one or more processors are configured to cause the cache drive to:
receive, from the IO interface, a write request to write data comprising a plurality of segments ordered randomly from a plurality of clients;
cache the data corresponding to the write request in the cache storage;
perform one or more compute processes on the data, wherein the one or more compute processes include:
locating one or more segments from the plurality of segments, wherein the one or more segments are from one client of the plurality of clients; and
merging data from the one or more segments, to merge the data from the one client of the plurality of clients; and
in response to performing the one or more compute processes on the data, provide the processed data to the storage cluster for storing via the IO interface.

12. A cache drive in a compute server of a computer cluster, the cache drive comprising:
a cache storage configured to store data;
an IO interface communicatively coupled to the computer cluster and a storage cluster; and
one or more processing units communicatively coupled to the cache storage and the IO interface, wherein the one or more processors are configured to cause the cache drive to:
receive, from the IO interface, a write request to write data comprising a plurality of segments ordered randomly from a plurality of clients;
cache the data corresponding to the write request in the cache storage;
perform one or more compute processes on the data, wherein the one or more compute processes include:
locating one or more segments from the plurality of segments, wherein the one or more segments are from one client of the plurality of clients; and
merging data from the one or more segments, to merge the data from the one client of the plurality of clients; and
in response to performing the one or more compute processes on the data, provide the processed data to the storage cluster for storing via the IO interface.

13. The cache drive of claim 12, wherein:
the compute processes comprise cyclic redundancy checks, redundant array of independent disks encoding, or error correction code encoding.

14. The cache drive of claim 12, wherein the one or more processing units are further configured to cause the cache drive to:
receive, from the IO interface, a read request to read data from the storage cluster;
read the data corresponding to the read request from the storage cluster via the IO interface; and
cache the data corresponding to the read request in the cache storage; and
provide the data cached in the cache drive to the compute server computer cluster via the IO interface.

15. The cache drive of claim 14, wherein the one or more processing units are further configured to cause the cache drive to:
in response to receiving the read request, determine whether the data corresponding to the read request is cached in the cache storage; and
in response to a determination that the data corresponding to the read request is cached in the cache storage, provide the data cached in the cache drive to the computer cluster via the IO interface.

16. The cache drive of claim 14, wherein the one or more processing units are further configured to cause the cache drive to:
in response to receiving the read request, determine potential data for data prefetching from the storage cluster; and
perform data prefetching on the potential data to cache the potential data in the cache storage.

17. The cache drive of claim 12, wherein the cache drive is communicatively coupled with the computer cluster and the storage cluster via a network card in the compute server.

18. The cache drive of claim 12, wherein the cache storage comprises one or more flash drives.

* * * * *